Sept. 19, 1933.   P. KAPITZA ET AL   1,927,457
BRAKE
Filed July 30, 1928    4 Sheets-Sheet 1

Inventors
P. Kapitza
P. K. Lomonossoff

BY
*[signature]*
ATTORNEY

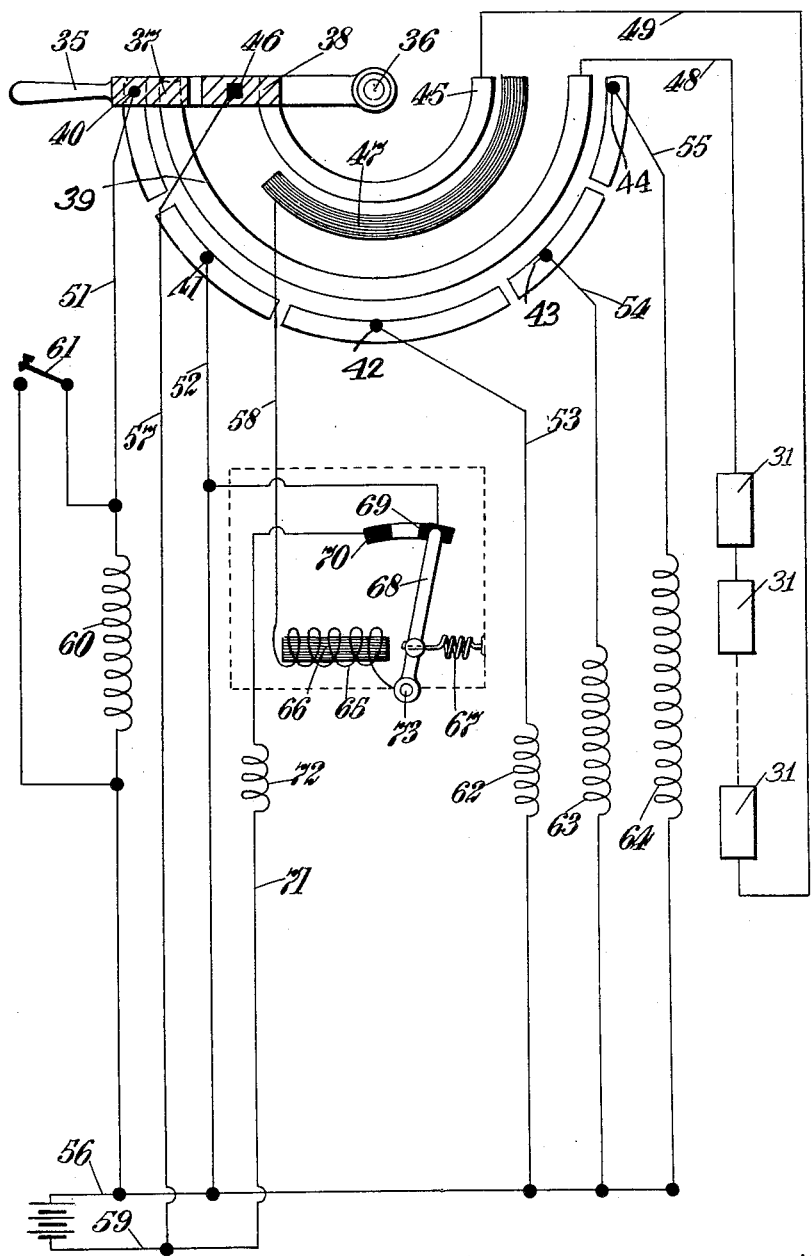

Patented Sept. 19, 1933

1,927,457

UNITED STATES PATENT OFFICE 1,927,457

BRAKE

Pierre Kapitza and George Voldemar Lomonossoff, Cambridge, England

Application July 30, 1928, Serial No. 296,369, and in Germany October 11, 1927

11 Claims. (Cl. 188—173)

This invention relates to brakes and braking devices.

It has previously been proposed to have a brake which is mechanically applied as for example by means of a spring or compressed air, but is normally held off by electromagnetic means. In one such proposal the electromagnetic device included a cylindrical armature sliding within a core of a solenoid, this device being capable of being variably controlled so as to set the braking force at any desired intermediate value. With such a device however the current consumption is excessive, and for this reason it is desirable to utilize an armature adapted to move into contact with a core of a solenoid, so that when the brake has actually been forced back into the off position by a strong current against the mechanical applying force, a weak current will thereafter suffice to maintain it in the off position owing to the supplementary effect of the magnetic lines of force through the core and armature which, as is well known, when once set up remain extremely strong and stable long after the generating current has been substantially diminished.

With such an arrangement however, difficulty is experienced in re-applying the brake in a gradual manner, since, on further diminishing the holding-off current the remnant magnetism in the armature and core will prevent the armature from moving until the holding-off current has reached a very small value, when the armature will move suddenly and with a jerk to an extent sufficient to cause the brake to be applied with substantial force, smooth braking being practically impossible with ordinary simple apparatus of this character.

It is accordingly the object of the present invention to provide an arrangement whereby a mechanically applied brake held off by electromagnetic means may include an armature adapted in the holding-off position to contact with the core of a solenoid, to be held in the off position by a much smaller current than is necessary to withdraw it into the off position, and finally to be enabled to come away from the holding-off position for the purpose of re-applying the brakes with any required degree of gradualness. The advantages of such an arrangement are numerous, and amongst them may be mentioned the following.

In a long train of vehicles all the trucks can be controlled simultaneously from the engine, whereas with pneumatic or vacuum operated brakes there is an appreciable time lag between the operation of the control in the locomotive and the application of the brake on a remote vehicle.

Utilizing a coiled or other metallic spring as the braking force, simple means may be readily provided for controlling and adjusting the effective braking effort, so that the brakes on a given truck may be varied for a given journey in accordance with the load. This is a valuable advantage since normally the brakes are set so that the braking effort does not exceed 95 per cent of the minimum load intended to be carried in a given truck so as to prevent wheel skid; this fixed braking effort however could with advantage be increased when maximum loads are carried, and with the present invention a ready means of varying the braking effort is provided. The means for varying the braking effort are preferably combined with and form part of hand-operated means for applying or taking off the brake independently of the magnetically controlled means previously described.

The invention further includes the provision of a specially-shaped armature to co-operate with the holding-off solenoid and adapted to be readily designed so as to give suitable increments of braking force for each increment of movement of the armature as may be required according to the system of linkages or levers by which the armature is connected to the brake shoes.

For the purpose of carrying out the above invention and securing the advantages set forth it is a further important object of the invention to provide an electromagnetic holding-off apparatus including a switch or relay so arranged that when it is desired to re-apply the brake the holding-off current in the solenoid is first broken, and when the armature begins to move away from the core the back E. M. F. thereby produced operates the relay or switch and causes the solenoid current to be re-applied. By this means the following new advantage is secured.

The risk of the operator moving the controller arm from the full off position to the next or partly off position quicker than the armature can get away from the core to break down the remanent magnetism is avoided, since the solenoid current corresponding to the partly off position is not generated until the armature has actually moved sufficiently to set up the necessary back E. M. F.

With these and other objects in view a form of execution of the invention will now be described by the aid of the accompanying drawings, in which, Fig. 1 illustrates general mechanism for braking an ordinary truck or like vehicle;

Fig. 2 being a detail of the adjusting device;

Fig. 3 illustrates a wiring diagram for the electromagnetic control apparatus;

Figures 4, 5:
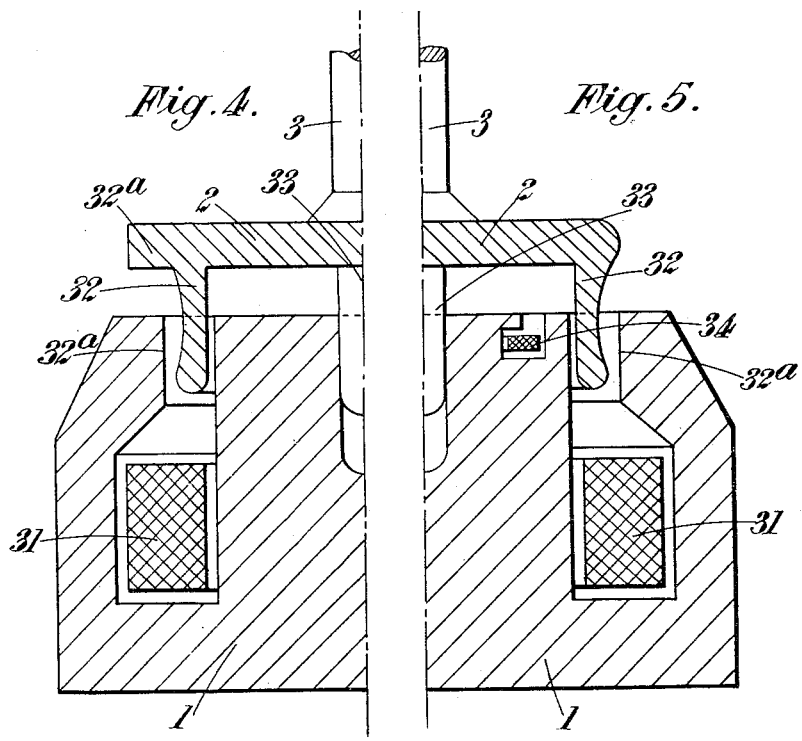
Fig. 4 is an illustration of a solenoid and armature.

Fig. 5 being a modification of Fig. 4.

Figure 6:
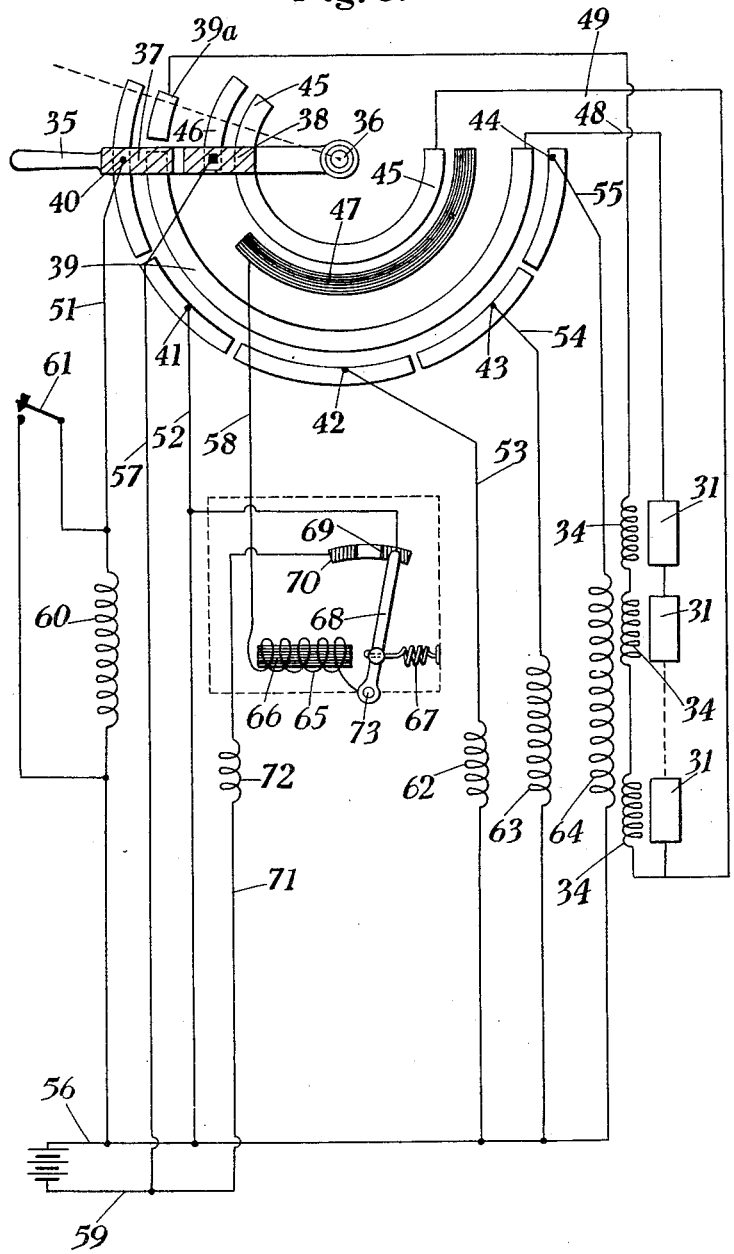

Figure 6 illustrates a wiring diagram for the modified electro-magnetic control apparatus shown in Figure 5.

Figure 1:
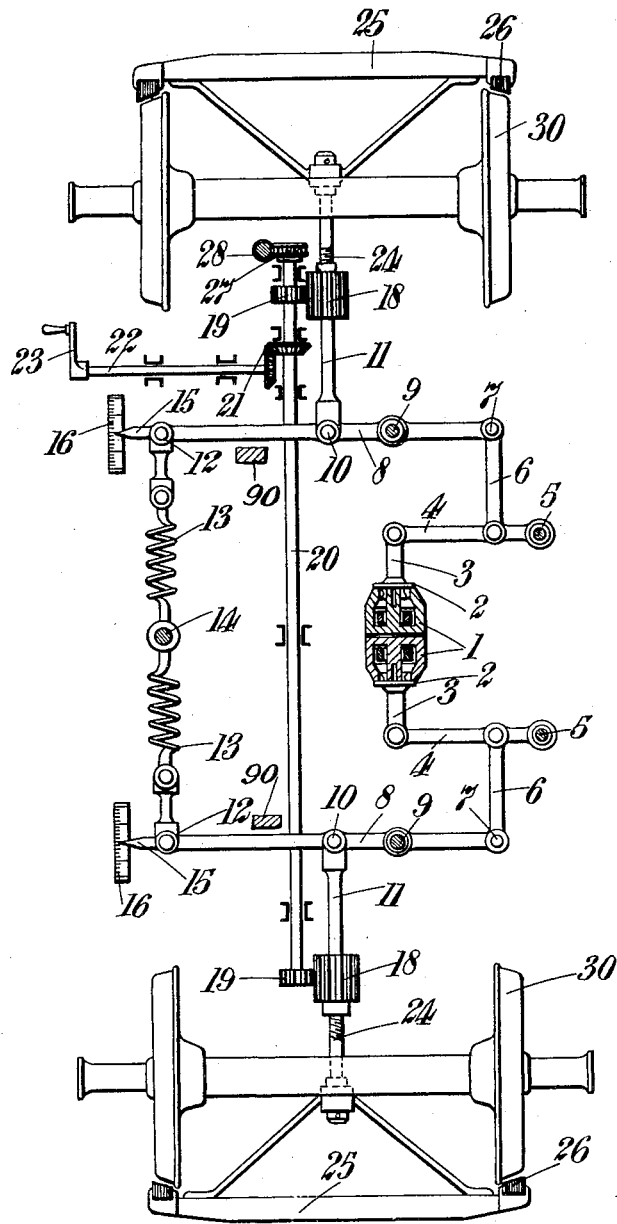
Figure 2:
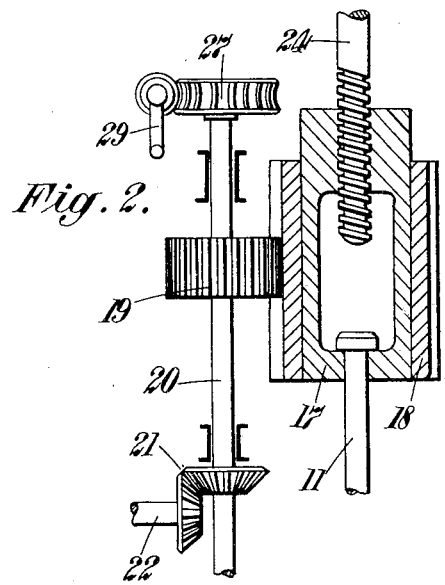

Turning first to Fig. 1, two oppositely-arranged electro-magnets 1 are provided, their armatures 2 being connected by means of rods 3 to levers 4 which rock about hinges 5 fixed to the frame. Rods 6 are articulated at 7 to levers 8 which can turn about the hinges 9 fixed to the frame. Rods 11 are articulated at 10 and brake-applying springs 13 are jointedly connected at 12 to the levers 8, the springs 13 being anchored by means of hinges 14 to the frame. Stops 90 are provided to limit the movement of levers 8 under the action of spring 13. The ends of levers 8 carry pointers 15 to read in tons of brake pressure on scales 16. Turnbuckle 17 is rotatably connected to rods 11 shown separately and enlarged in Fig. 2. The turn-buckle devices carry external toothed rims 18 throughout their length which are in mesh with pinions 19 keyed on to a shaft 20. This shaft runs on bearings in the frame and by means of a detachable handle 23 manipulated either from outside or inside the car, can be rotated by hand through conical gears 21 and shaft 22 placed in the frame. Turnbuckles 17 have threaded engagement with spindles 24 connected to the brake links 25 carrying brake shoes 26. Shaft 20 further carries a worm gear 27, the worm shaft 28 being arranged perpendicularly and rotatable by detachable handle 29 Fig. 2. In the form shown handle 23 is outside the body of the car and handle 29 within it. It will be seen that by rotating either of the handles 23 or 29 the effective length of the arm 24, 11 of the brake linkage is varied and that this operation can be performed either to a slight degree, e. g. when shoes 26 are replaced or worn, or to adjust the braking pressure according to the load to be carried by the vehicle. By increasing the effective length of the arm 24—11 by a sufficient amount, the levers 8 will be brought into contact with stops 90, and any further increase of length will result in putting the brakes in the full off position. Conversely, by shortening the effective length of the arm 24—11, the brakes may be brought into the full on position.

As shown in Fig. 4, the electro-magnet, or the solenoid, consists of the main magnetic body or core 1, the magnetizing coil 31 and the armature plate 2 to which is attached the rod 3 connected with the brake mechanism. Armature 2 has an annular depending extension or flange 32 and a guiding stud 33 engaging a central hole in the core.

The flange 32 when the armature is in the holding-off position in contact with the core 1 is entirely seated within an annular slot 32a within the body of the core.

It will be appreciated that the magnetic lines of force generated by the current in the coil 31 traverse slot 32a horizontally, that is to say, at right angles to the direction of movement of the armature, and it will be appreciated that the principal mechanical force exerted in withdrawing the brake is exercised on the flange 32. Thus by shaping the flange in a suitable way which can easily be designed, it is possible to vary the relation between increments of movement of the armature towards the core and increments of pressure applied by the brake shoes so as to counterbalance any variation that may occur during the full stroke of springs 13 owing to the obliquity of the transmitting levers or linkages or for any other suitable or desired purpose. This variation as is well known will be profoundly influenced by the width of the air-gap between flange 32 and the walls of slot 32a at each point in the height of the flange.

In the form illustrated in Fig. 4, the reduced current required to maintain the armature in the contacting position after once it has been brought there is also passed through the magnetizing coils 31, but in the form illustrated in Fig. 5 the holding-off current is applied through a second coil 34, the withdrawing coil 31 being idle after the armature has been finally moved back.

In the form illustrated in Fig. 4 it is desirable to have an external flange 32a extending in line with the plate 2 beyond the annulus of flange 32 so as to take full advantage of the magnetic force during the holding-off period, but with the form illustrated in Fig. 5 this extension is obviously unnecessary.

The electrical control apparatus comprises a handle or control arm 35 which rotates about the pivot 36 and bears two contact plates 37 and 38. Plate 37 is adapted to connect in turn the conducting strip 39 with five separate contacts 40, 41, 42, 43, 44. At the same time plate 38 connects a second strip 45 with either a separate contact 46 or with a contact strip 47 extending over the whole region of contacts 40, 41, 42, 43, 44. The strips 39 and 45 are connected by leads 48 and 49 with the ends of coils 50 of the separate electro-magnets of the vehicles of the train, these being connected, in this case, in series. By means of the leads 51, 52, 53, 54, 55, the contacts 40, 41, 42, 43, 44 are connected to one of the poles of the source of supply, and contact 46 by the lead 57 is connected to the other pole 59 of the source of supply. Contact strip 47 is connected by lead 58 to the relay or switch described below. In the lead 51 is introduced a resistance 60 which can be cut out by a switch 61 operated either by hand or from the handle 35 by any suitable mechanical connection. In the leads 53, 54, 55 rheostatic resistances 62, 63, 64 are introduced. In the lead 53 is introduced a coil 65 surrounding a core 66 and adapted when energized to move a relay-lever 68 hinged at 73 against a spring 67 from connection with a contact 69 to a contact 70. Contact 69 is connected to the lead 52 i. e. to the pole 56 of the source of supply, while contact 70 is connected by means of lead 71 and through the resistance 72 to the other pole 59 of the supply.

The operation of the apparatus described is as follows.

The brakes are normally applied by the springs 13 through the intermediary of lever 8 and links 11, 24; they are however adapted to be held off wholly or in part against pressure of springs 13 through the intermediary of links 6, 4, 3 when the armature plates 2 are attracted towards the cores 1 on the passage of current through the windings 31. Their effective brake pressure is adapted to be adjusted by turning either of the handles 23 or 29 through the intermediary of turnbuckles 17 which vary the effective length of the arms 24, 11. As hereinbefore described on further operation of the handles 23, 29 the brakes can be set permanently either in the full-on or full-off position, or in any intermediate position. During the rotation of the turnbuckles they slide inwards relatively to gears 19 as will be readily understood.

For magnetic control of the brakes the handle 35 is rotated. In the position illustrated handle 35 is in the full-off position so that armature plate 2 is in contact with the core 1. To reach this position maximum current requires to have been transmitted through the coils 31, this having been effected through strips 39, 45, lead 51, switch 61 to pole 56, and lead 57 to pole 59. After the armature has reached the full off position switch 61 is opened and the current in lead 51 passes through resistance 60 whereby a much smaller holding-off current continues to be transmitted through the windings, this being sufficient when augmented by the magnetism of the contacting metal parts of the armature and core to retain the armature in the full off position after once it has been brought to that position by the larger current. The arrangement thus described corresponds to Fig. 4 of the drawings whereby a smaller current is transmitted through coil 31. To adapt this arrangement for use in conjunction wth Fig. 5 of the drawings a further separate pair of contacts will be provided in the control mechanism, and a separate pair of leads extending to the solenoids 31 in Fig. 3 to connect up the holding-off coils 34 for alterative use, as shown in Fig. 6.

It now being required to apply the brake the handle 35 is moved to the preparatory position in a manner similar to that in connection with pneumatic brakes. In this position strip 45 is coupled to the strip 47, and the strip 39 to the contact 41.

When the arm 35 reaches the prepartory position it will be seen that the pulling off current applied through contacts 40, 46 is broken and that the solenoids 31 are short-circuited through 52, 58, coil 65 and lever 68. As the armature moves away from the coil the back E. M. F. produced by its movement generates a current in coil 65 which pulls the lever 68 over to connect with contact 70. Current from the source 56, 59 now passes through the solenoids through lead 52, strip 39 and lead 71, resistance 72, contact 70, lead 58 and strip 47.

The current now passing is of course much greater than the amount of the holding-off current transmitted through resistance 60; it is however substantially less than the pulling off current transmitted through switch 61 which was necessary in the first place to compress the springs 13. The resistance 72 is so chosen that the current passing through it (in the absence of other external resistances) is just sufficient to allow the brake shoes to contact with the wheels without exerting pressure thereon. The holding off current may be described as a current of intermediate value, that is to say, lower than the maximum pulling off current.

The armature having by this time moved away from contact with the core (this movement being required to occur before relay lever 68 could be actuated) further application of the brake may now be safely effected by further movements of the control arm 35 switching in resistances 62, 63, 64 in turn so as to diminish the current in the coils 31 in successive stages. It will be observed that resistances 62, 63, 64 are added in each case to resistance 72, being interposed in the opposed lead. Obviously these resistances can be graduated in any manner as desired to provide for the necessary gradualness in braking up or down. It will be clearly appreciated that the provision of the automatic relay or switch 68 is only required to provide for the first initial movement of the armature away from the core, and that in the absence of this device the controlling handle 35 could be moved for example, right round to contact 44 before there was any likelihood of the armature moving away from the core, since resistance 64 is the only resistance which exceeds resistance 60 and the current which is able to pass resistance 60 is also able to retain the armature in the holding-off position. The brakes therefore in the absence of the relay device will remain off until the handle 35 reaches contact 44 whereupon they would be suddenly applied with almost maximum force. With the arrangement described however this eventuality is avoided and the brakes can be applied with any desired degree of gradualness.

It will be appreciated that the whole apparatus provides a means whereby the brakes of a long train can be applied simultaneously by a single operation on the part of the driver of the locomotive with far greater exactitude than can be afforded with any other system of transmission, and further, that the apparatus adapts itself readily for many kinds of brake adjustment, for example, according to load, according to gradient, according to weather, to which other systems do not lend themselves. Further, that owing to the provision of an armature which contacts with an iron core the brakes can safely and firmly be maintained in the off position for the usual prolonged periods with safety and with little risk of derangement by the expenditure of a comparatively small amount of current, and finally that the disadvantages which have been normally inherent in the use of contacting armatures are eliminated by the automatic relay or switch operated by the back E. M. F. generated on initial movement of the armature.

It will be appreciated that in all cases the air spring or vacuum pressure may be substituted for the metal spring described, and the appended claims are to be understood in this regard to include any suitable form of resilient power storing device in the term spring.

We claim:—

1. In combination a brake, a spring to apply said brake, a solenoid to hold off said brake against said spring, a circuit to supply an energizing current to said solenoid, a resistance external to said circuit, and means including a coil in the circuit and an associated armature whereby when said energizing current is broken, the current induced by said break automatically operates to restore said energizing current through said resistance.

2. In a vehicle, a plurality of brakes, springs to apply said brakes, solenoids to hold off said brakes against said springs, circuits to supply an energizing current to each solenoid from a common source, a controller to said circuits, a switch and means whereby when said circuits are broken by said controller, a current induced by said break is caused to operate said switch to restore said energizing currents at an intermediate value.

3. In a train, a plurality of vehicles, a plurality of brakes to said vehicles, springs to apply said brakes, solenoids to hold off said brakes against said springs, circuits to supply an energizing current to each solenoid from a common source, a controller to said circuits, a switch and means whereby when said circuits are broken by said controller, a current induced by said break is caused to operate said switch to restore said energizing currents at an intermediate value.

4. A brake, a spring to apply said brake, a solenoid and an armature to restrain said spring, a core to said solenoid, said armature being adapted to contact with said core, means to supply a strong energizing current to said solenoid to attract said armature and means to supply thereafter a weaker energizing current to hold said armature attracted.

5. A brake, a spring to apply said brake, a section including a solenoid, electro-magnetically influenced means adjacent a portion of said circuit, an armature to compress said spring when said solenoid is energized by a current, and means whereby when said energizing current is broken, movement of said armature under the extension of said spring operates said electro-magnetically influenced means to reapply said energizing current at an intermediate value to hold back said armature or armatures.

6. In a train, a plurality of vehicles, a plurality of brakes to said vehicles, a plurality of springs to apply said brakes, a circuit including a plurality of solenoids, electro-magnetically influenced means adjacent a portion of said circuit, and armatures to compress said springs to hold off said brakes when said solenoids are energized by currents, a single controller to control said energizing currents and means whereby when said currents are broken, movement of said armatures under the extension of said springs operates said electromagnetically influenced means to reapply said energizing currents at an intermediate value to hold back said armature or armatures.

7. A brake, a spring to apply said brake, a solenoid and armature to compress said spring and hold off said brake when said solenoid is energized, a source of current, a plurality of sets of contacts adapted to connect said solenoid alternatively to said source, a controller movable relatively to said contacts, an electro-magnetically operated relay or switch in a lead common to one of said sets of contacts, and means whereby when said controller has moved from the other of said sets of contacts said switch is required to operate before any of the later sets of contacts can transmit current to said solenoid.

8. In combination with a solenoid, a core, a slot in said core, an armature, a projection to said armature, said projection moving in said slot at right angles to the direction of the lines of force exerting a moving force upon it, oppositely arranged faces of said slot having opposite magnetic polarity.

9. In combination a solenoid, a core, an armature movable by said solenoid, and means on said armature to receive the magnetic pull of said solenoid through the intermediary of magnetic lines of force extending substantially at right angles to the direction of said movement.

10. In a vehicle, a plurality of mechanically applied brakes, electromagnetic means to restrain and control said brakes, a single electromagnetic controller to said means, and means to each brake to adjust the braking effort, said adjusting means having a complete range between the full off and full on positions, and being conveniently operable while the vehicle is in motion.

11. In a vehicle, a brake shoe normally applied by a spring and held off by an electromagnetically controlled armature, a core to attract said armature, a circuit to apply a current to energize said core to hold the shoe in the full off position, electromagnetic means adjacent a portion of said circuit whereby when said circuit is broken, a current of diminished strength is applied to energize said core before said armature has had time to complete its stroke.

PIERRE KAPITZA.
GEORGE VOLDEMAR LOMONOSSOFF.